United States Patent [19]

Zeilenga

[11] 4,411,054

[45] Oct. 25, 1983

[54] ART OF INSTALLING A SINK DRAIN FLANGE ASSEMBLY CAPABLE OF SUPPORTING A GARBAGE DISPOSAL

[76] Inventor: William Zeilenga, 10237 Walnut St., Bellflower, Calif. 90706

[21] Appl. No.: 287,521

[22] Filed: Jul. 27, 1981

[51] Int. Cl.[3] ........................ B23P 11/02; B25B 27/14; B23Q 1/00

[52] U.S. Cl. ........................................ 29/434; 29/453; 29/559; 29/281.1; 29/281.6; 4/DIG. 4; 269/49

[58] Field of Search ................. 29/434, 436, 450, 237, 29/453, 281.6, 157 R, 266, 235, 258, 559, 281.1; 4/286, 650, DIG. 4; 269/49

[56] References Cited

U.S. PATENT DOCUMENTS

| | | | |
|---|---|---|---|
| 1,481,061 | 1/1924 | Hunter | 29/266 X |
| 2,182,480 | 12/1939 | Lowry | 269/49 X |
| 2,684,139 | 7/1954 | Lewis | 29/434 X |
| 2,978,801 | 4/1961 | Erdmann | 29/453 X |
| 3,116,362 | 12/1963 | Rankin | 29/453 UX |
| 3,232,088 | 1/1966 | Newcomer, Jr. et al. | 29/453 UX |
| 3,599,315 | 8/1971 | Pizzagalli | 29/237 X |
| 3,812,756 | 5/1974 | Wenger | 29/453 X |
| 3,990,135 | 11/1976 | De Angelis | 29/157 R |
| 4,135,258 | 1/1979 | Braga et al. | 4/DIG. 4 X |
| 4,175,734 | 11/1979 | Williams | 269/49 |

FOREIGN PATENT DOCUMENTS

| | | | |
|---|---|---|---|
| 569349 | 1/1959 | Canada | 4/DIG. 4 |
| 551276 | 2/1943 | United Kingdom | 269/49 |

*Primary Examiner*—Charlie T. Moon
*Attorney, Agent, or Firm*—Dominick Nardelli

[57] ABSTRACT

A removable clamping device is disclosed for firmly holding a drain flange within the drain hole of a sink, so that one can assemble around the depending body of the flange which body is disposed below the sink one or more rings and a split spring type ring or Cee-shaped keeper so that the rings are maintained around the body of the flange and in turn a garbage disposal may be mounted to the rings.

3 Claims, 3 Drawing Figures

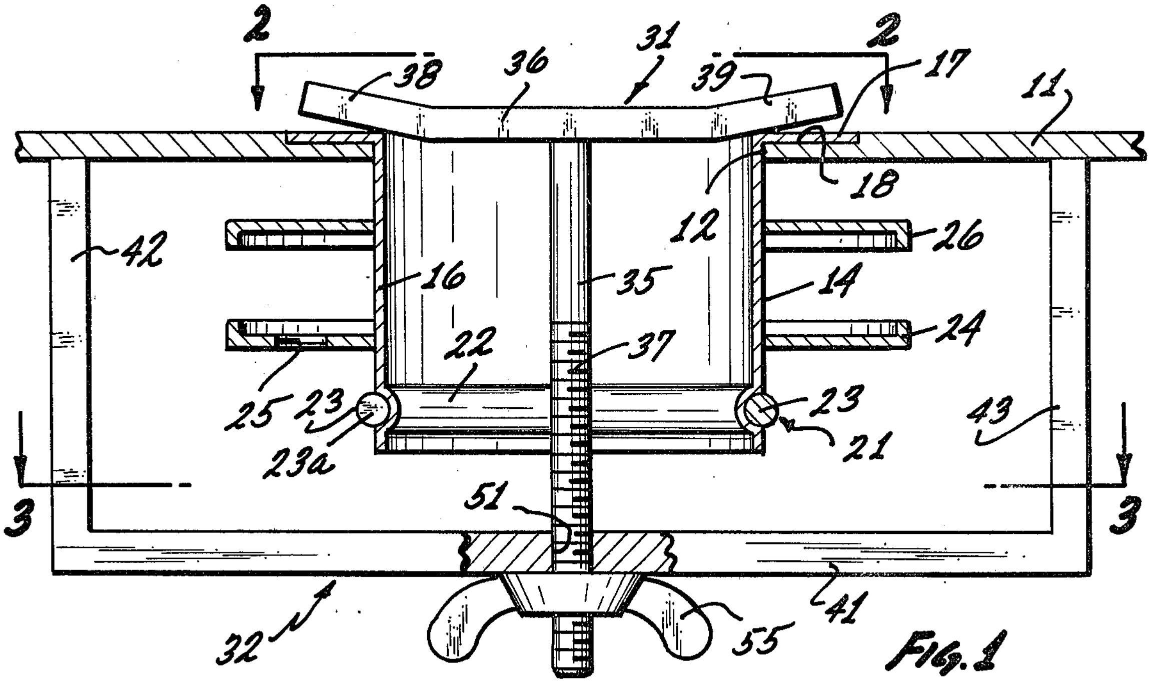
FIG. 1
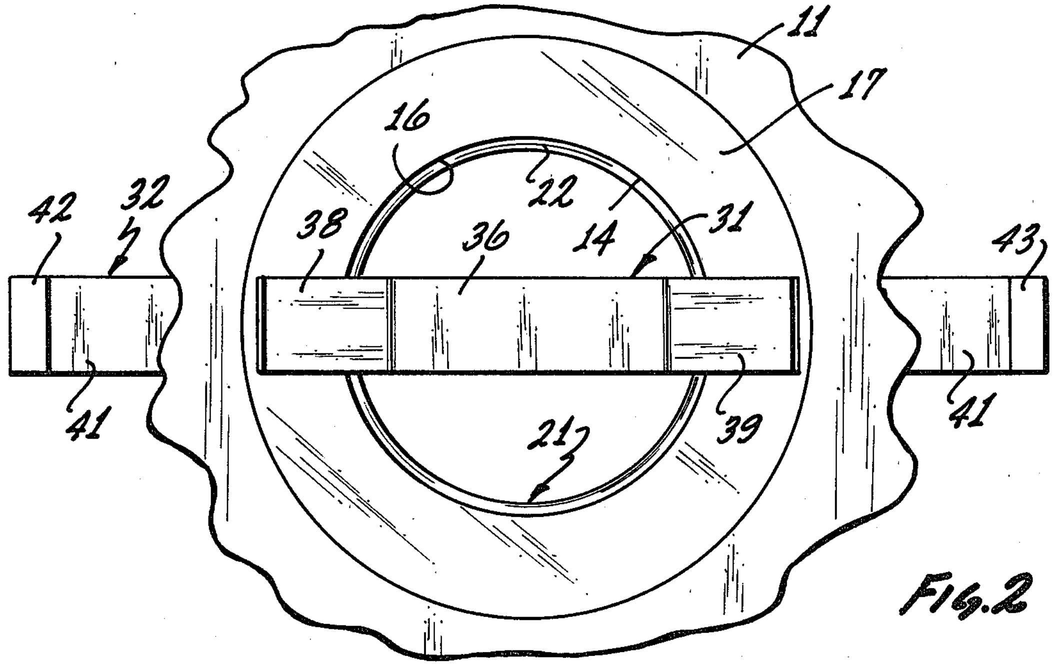
FIG. 2
FIG. 3
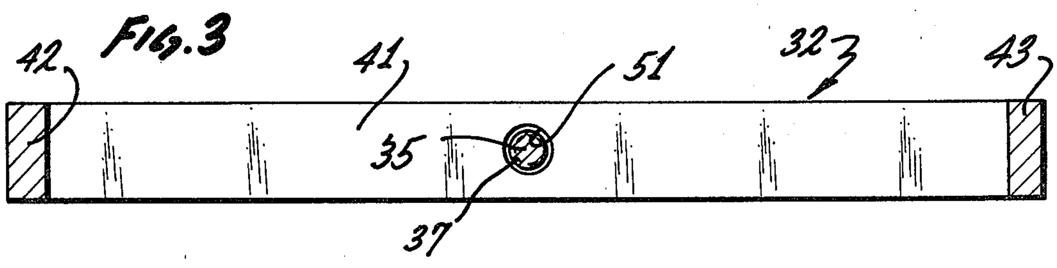

ART OF INSTALLING A SINK DRAIN FLANGE ASSEMBLY CAPABLE OF SUPPORTING A GARBAGE DISPOSAL

FIELD OF THE INVENTION

This invention relates generally to installation methods and tools and more particularly to a method and tool for holding a sink drain flange in order to mount a garbage disposal under the sink.

DESCRIPTION OF PRIOR ART

To install, for example, a garbage disposal under a sink, the disposal is attached to a special drain flange depending down through the drain hole of the sink. The special flange has a tubular body with an external diameter which is substantially the same as the diameter of the drain hole. At the lower end of the body is a circumferential groove which holds a Cee-shaped keeper or a split ring. A split ring prevents one or more flange rings, which are disposed above the ring from falling down from the body. Each flange ring is flat while the lower ring has three tapped holes evenly spaced therearound. The garbage disposal has a top flange with three spaced holes therein. The disposal is supported by a bolt extending through each hole in the garbage disposal flange and threaded into one of the tapped threaded holes on the lower ring. As the bolts are tightened, the end of each bolt urges the upper ring against the underside of the sink and the threaded lower ring bears against the split ring.

One can now understand that after the drain flange is inserted in the drain hole the rings cannot be disposed therearound. One is required to go under the sink and place the two rings around the body of the drain flange. To secure the split ring, one needs another person to hold the flange down against the drain hole of the sink because of the relatively large force needed to open the split ring and secure it in place.

OBJECTS OF THE INVENTION

An object of the invention is to provide a method and means for temporarily holding the drain flange in place while one is assembling at least one ring therearound and is securing a split ring.

Another object is to provide a simple economical tool for temporarily holding a drain flange, which tool can be manipulated by one person, preferably from under the sink.

These and other objects and features of advantages will become more apparent after one studies the following description of the preferred embodiment of my invention together with the appended drawings.

BRIEF DESCRIPTION OF THE DRAWING

FIG. 1 is an elevation front view of my novel device shown in combination with a sink (partially shown) and a drain flange.

FIG. 2 is a view taken on line 2—2 of FIG. 1 and, in the direction of the arrows, shown with the sink partially broken away.

FIG. 3 is a sectional view taken on line 3—3 of FIG. 1 in the direction of the arrows.

DETAILED DESCRIPTION OF THE DRAWINGS

Item 11 represents the bottom panel of a standard sink having a drain hole 12 through which is disposed a sink drain flange 14. Sink drain flanges generally have a tubular body 16 with a flange 17 formed at one end. The sink 11 generally has a bossing or recess 18 into which the flange 17 nests as shown. The lower depending end of body 16 has a means 21 onto which is coupled a sewer line (not shown). However, because this invention relates to the art of mounting garbage disposals, the means 21 is of the standard design which allows the attachment of a garbage disposal. As a refresher, the means 21 consists of a circumferential outer groove 22 formed on or near the lower body of the body 16. Within the groove 22 is disposed a standard split ring 23 which is made of round stock having, for example, a diameter of one-quarter inch. Ring 23 is split at surface 23*a*. Since the ring 23 is made of one-quarter inch round stock, the depth of the groove 22 is at least one-eighth of an inch or of sufficient depth to ensure that the split ring 23 does not become accidently disengaged therefrom when subjected to thrust loads. In addition, when a garbage disposal is to be attached, two flat rings are disposed around the body 16 and above the split ring 23. The lower ring 24 has at least three axially parallel threaded holes such as hole 25 shown in FIG. 1, and these holes are spaced evenly around the ring 24. The ring 26 has no holes. As one skilled in the art knows, onto these rings the garbage disposal is suspended.

As one observes from the drawing, the outside diameter of the body 16 is substantially equal to the diameter of the opening 12 in the sink, so that the split ring 23 has to be removed therefrom before the drain flange 14 can be inserted within opening 12. Also rings 24 and 26 must be removed from around the body 16. After the drain flange 14 is in place as shown, the rings 24 and 26 must be installed around the body 16 and the split ring 23 must be locked into place into groove 22. Up to now, in order to accomplish this task, a helper had to be called on to push down on the drain flange 14 while the plumber installed rings 23, 24, and 26. Many times a helper is not available and this task is next to impossible to perform without a helper.

I have devised a tool which is operable by only a single person and firmly holds the drain flange 14 in place within the sink 11. The tool is made of two pieces, a tee-bolt 31 and a yoke 32. The tee-bolt 31 has a threaded body 35, onto one end being a crossbar 36. The threads 37 on body 35 extend to the free end. The crossbar 36 has upturned ends 38 and 39 for reasons that will become apparent hereinafter. As shown in FIG. 2, the bar 36 is long enough to straddle the opening of the drain flange and as shown in FIG. 1 the upturned ends 38 and 39 facilitate the centering of the body 35 of the tee-bolt within the opening of the drain flange 14. The yoke 32 is made to have a U-shape with a bar 41 having perpendicular legs 42 and 43 at each end. The length of the bar 41 is sufficient to clear the rings 24 and 26 and the length of the legs 42 and 43 is such that bar 41 does not interfere with the drain flange 14. At the center of bar 41 is an aperture 51 through which the threaded body 35 passes.

The tool is used by first inserting the drain flange 14 into opening 12 of the sink 11 from the top of the sink. The tee-bolt 31 is also dropped into place as shown. Then the plumber goes under the sink 11 and places the rings 23, 24 and 26 in order around the threaded body 35. The end of body 35 is inserted into aperture 51 of yoke 32. Then a wing nut 55 is threaded onto threads 37 and turned until the legs 42 and 43 bear against the underside of the sink. The drain flange 14 is now secured and cannot move. The ring 26 is raised into place around the body 16 and then ring 24 is raised. Ring 23 is expanded so that surfaces 23*a* are spread apart and ring 23 is now nested within the groove 22 on the drain flange. Now the tool is removed by unfastening the wing nut 55. Under certain conditions, one skilled in the art can understand that tee bolt 31 can be dropped out of the bottom of the drain flange 14.

Having described the preferred embodiment of my invention one understands that my invention is not limited to the disclosed embodiment but includes all embodiments coming within the scope of the appended claims. A person skilled in the art can devise other embodiments without departing from the spirit of my invention.

I claim:

1. A device for temporarily securing a drain flange tube within a drain hole of a sink, said device comprising:

a U-shaped yoke having an aperture substantially disposed at its center;

a tee-bolt having a threaded body and a cross bar disposed perpendicularly to said threaded body;

said threaded body having a diameter which allows it to pass through said aperture;

a nut for threading onto said body;

said cross bar has upturned ends which turn away from said threaded body.

2. The device of claim 1 wherein said U-shaped yoke comprises:

a straight bar, and;

a pair of legs, which are disposed at each end of said bar and perpendicularly with said bar.

3. A method of installing a sink drain flange tube assemly into a drain hole of a sink wherein the drain flange tube has at least one freely floating ring to be disposed therearound and a split ring of the spring type mounted in an external groove adjacent the end of the tube remote from the flange of the drain flange tube and for holding the floating ring in place, said method comprising:

placing the drain flange tube into the hole of said sink;

dropping a tee-bolt having a cross bar and a threaded body down through said drain flange tube with the cross bar resting on said drain flange and said threaded body depending through said drain flange tube;

holding a floating ring around the depending portion of said drain flange tube and said threaded body;

placing a U-shaped yoke having a centrally disposed aperture under said sink with the ends of said yoke touching said sink and said threaded body disposed through said aperture;

tightening a nut onto said threaded body to cause said yoke to be urged against said sink;

expanding said split ring so that said threaded body passes through the expanded ends, and;

placing said split ring into said groove.

* * * * *